United States Patent [19]

Reulein

[11] Patent Number: 5,255,868
[45] Date of Patent: Oct. 26, 1993

[54] SELF-LOCKING SAFETY BELT REELING DEVICE WITH A SHOCK-ABSORBING DEVICE

[75] Inventor: Hermann Reulein, Neuss, Fed. Rep. of Germany

[73] Assignee: Autoflug GmbH & Co. Fahrzeugtechnik, Rellingen, Fed. Rep. of Germany

[21] Appl. No.: 847,902

[22] Filed: Mar. 6, 1992

[30] Foreign Application Priority Data

Mar. 6, 1991 [DE] Fed. Rep. of Germany ... 9102691[U]

[51] Int. Cl.$^5$ .................. B60R 22/28; B60R 22/34; A62B 35/04
[52] U.S. Cl. .................. 242/107; 242/107.3; 280/805; 280/806; 297/470; 297/480
[58] Field of Search .................. 242/107, 107.3; 297/475, 470, 480; 280/805, 807, 806

[56] References Cited

U.S. PATENT DOCUMENTS

| | | | |
|---|---|---|---|
| 3,881,667 | 5/1975 | Tandetzke | 280/805 |
| 3,999,780 | 12/1976 | Matsuoka et al. | 280/805 |
| 4,152,025 | 5/1979 | Bendler et al. | 280/805 |
| 4,162,772 | 7/1979 | Shimogawa et al. | 242/107 |
| 4,213,580 | 7/1980 | Kawaharazaki et al. | 242/107 |
| 4,215,830 | 8/1980 | Cunningham | 242/107 |
| 4,342,435 | 8/1982 | Yanagihara | 297/475 |
| 4,913,372 | 4/1990 | Takada | 242/107 |
| 4,917,324 | 4/1990 | Mori | 242/107 |
| 4,940,193 | 7/1990 | Grabowski | 242/107.3 |
| 4,978,139 | 12/1990 | Andres et al. | 280/805 |
| 5,080,298 | 1/1992 | Sasaki et al. | 242/107 |

FOREIGN PATENT DOCUMENTS 2803874 3/1982 Fed. Rep. of Germany .

*Primary Examiner*—William A. Cuchlinski, Jr.
*Assistant Examiner*—C. W. Fulton
*Attorney, Agent, or Firm*—Robert W. Becker & Associates

[57] ABSTRACT

A self-locking safety belt reeling device comprising a reeling arbor disposed in a belt housing is further provided with a spring housing attached to the belt housing. A return spring and a shock-absorbing spring are arranged inside the spring housing whereby the return spring has a greater spring force than he shock-absorbing spring. A coupling wheel with a wheel shaft is rotatable supported inside the spring housing for coupling the return spring to the shock-absorbing spring such that, in a first operational state, the return spring and the shock-absorbing spring together function as a reeling spring, and, in a second operational state, only the shock-absorbing spring functions as the reeling spring. The coupling wheel is actuatable as a function of a reeling state of the safety belt. A rotational oil damper with a spindle is connected to the spring housing and the spindle is fixedly connected to the wheel shaft of the coupling wheel to prevent sudden shock during the reeling process.

5 Claims, 1 Drawing Sheet

SELF-LOCKING SAFETY BELT REELING DEVICE WITH A SHOCK-ABSORBING DEVICE

BACKGROUND OF THE INVENTION

The present invention relates to a self-locking safety belt reeling device for the safety belt and a shock-absorbing device acting on the reeling device. The shock-absorbing device is comprised of a return spring and a shock-absorbing spring whereby the return spring has a greater spring force than the shock-absorbing spring. The two springs are arranged in a common spring housing. Inside the spring housing a coupling wheel, which is actuatable as a function of a reeling state of the safety belt, is provided for coupling the shock-absorbing spring and the return spring such that in a first operational state the return spring and the shock absorbing spring together function as a reeling spring and in a second operational state only the shock-absorbing spring functions as a reeling spring. The shock-absorbing device serves to absorb a sudden shock-like coupling effect.

A safety belt reeling device of the aforementioned kind is known from German Offenlegungsschrift 28 03 874. This safety belt reeling device is provided with a return spring which is suspended with one end from the spring housing and with the other end from a coupling wheel which is in the form of a ratchet wheel. This ratchet wheel is freely rotatable about the belt reeling arbor. A second shock-absorbing spring has a reduced spring force compared to the return spring and is connected with one end thereof to the ratchet wheel and with the other end to the safety belt reeling arbor. At the beginning of the withdrawing movement of the safety belt from the safety belt reeling arbor, the return spring and the shock-absorbing spring act as one spring due to their coupling via the freely rotatable ratchet wheel while, at a prescribed state of withdrawal, a further rotation of the ratchet wheel is prevented by a respective control device so that only the shock-absorbing spring acts on the safety belt reeling arbor.

One disadvantage of the known safety belt reeling device is that, when reeling the safety belt onto the safety belt reeling arbor, at a prescribed reeling state the action of the return spring is added via the control device to the spring force of the shock-absorbing spring which has been acting by itself during the initial reeling process so that the return spring with its stronger spring force suddenly acts on the shock-absorbing spring and forces it into a compact block because the windings of the shock-absorbing spring are suddenly tightly forced onto one another due to the sudden shock-like action of the return spring. The known safety belt reeling device is already provided with an expensive dampening means comprised of a plurality of components in order to avoid this sudden reeling shock.

It is an object of the present invention to improve the safety belt reeling device of the aforementioned kind such that the dampening means is of a simpler construction and functions more effectively.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
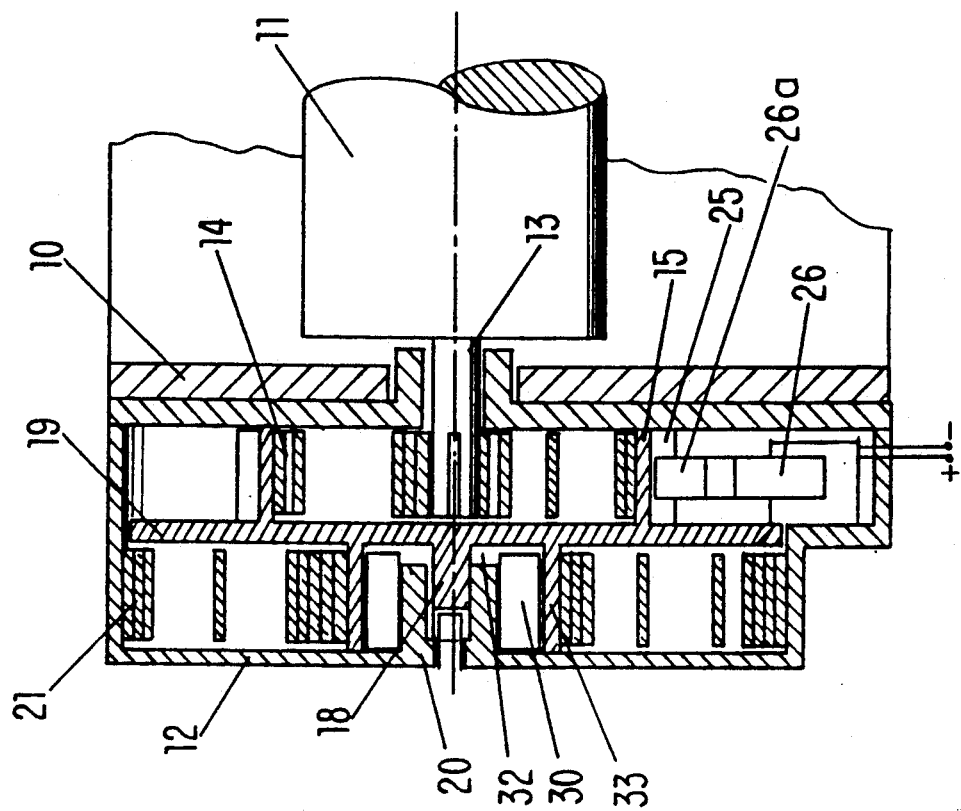
FIG. 1 is a cross-sectional view of a self-locking safety belt reeling device showing the spring arrangement.

The self-locking safety belt reeling device of the present invention is primarily characterized by a spring housing connected to said belt housing; a return spring and a shock-absorbing spring both arranged inside the spring housing, the return spring having a greater spring force than the shock-absorbing spring; a coupling wheel having a wheel shaft and being rotatably supported inside the spring housing for coupling the return spring to the shock-absorbing spring such that, in a first operational state, the return spring and the shock-absorbing spring together function as a reeling spring, and, in a second operational state, only the shock-absorbing spring functions as a reeling spring, the coupling wheel being aotuatable as a function of a reeling state of the safety belt reeling device; and a rotational oil damper having a spindle and a damper housing, the damper housing being connected to the spring housing and the spindle being fixedly connected to the wheel shaft.

The gist of the present invention is that the safety belt reeling device is provided with a rotational oil damper as the dampening means whereby the oil damper is connected to an immobile part of the safety belt reeling device, i.e., the spring housing, and the spindle is fixedly connected to the wheel shaft of the coupling wheel. This embodiment is advantageous because conventional safety belt reeling devices may be provided with a means for reducing the reeling shock, respectively, dampening the rotational movement of the wheel shaft, respectively, of the coupling wheel by simply providing a conventional rotational oil damper that is to be coupled with the wheel shaft of the coupling wheel and fixedly arranged with respect to the safety belt reeling device.

In a preferred embodiment of the present invention the damper housing may be connected to the outer wall of the spring housing whereby the spindle of the oil damper penetrates the damper housing and the spring housing in order to be fixedly connected to the wheel shaft of the coupling wheel.

As an alternative, the rotational oil damper may be provided inside the spring housing so that no constructive change of the outer contour of the safety belt reeling device and thus no enlargement of its size is required. This may be achieved by providing the coupling wheel with an axial projection that extends axially in the direction of the wheel shaft. Furthermore, the spring housing is provided with a bearing means engaging the wheel shaft. The axial projection surrounds at a distance the bearing means whereby the return spring is connected to the axial projection. The oil damper is then positioned in the annular space defined between the axial projection and the bearing means. Because in this embodiment the spindle and the wheel shaft are not axially aligned, the oil damper further comprises a radial transmission member that is connected to the spindle for connecting the spindle to the wheel shaft in a form-locking manner.

DESCRIPTION OF PREFERRED EMBODIMENTS

The present invention will now be described in detail with the aid of several specific embodiments utilizing FIGS. 1 and 2.

A reeling arbor 11 is supported within a housing 10 of a safety belt reeling device whereby the safety belt which is reeled onto the reeling arbor 11 is not shown in the drawing. To the side of the housing 10 of the safety belt reeling device a spring housing 12 is arranged into which an extension 13 of the reeling arbor 11 protrudes.

Within the spring housing 12 a shock-absorbing spring 14 is provided which with its inner end is connected to the extension 13 and with its outer end is connected to a projection 15 of a coupling wheel 19 which encloses the spring 14. The coupling wheel 19 has a wheel shaft 18 which engages a sleeve 20 provided at the inner side of the spring housing 12, the coupling wheel being freely rotatably supported within the sleeve 20. The coupling wheel 19 also divides the interior of the spring housing 12 into a first space which is facing the housing 10 of the safety belt reeling device for receiving the shock-absorbing spring 14 and into a second space in which the return spring 21 is arranged. The return spring 21 has a greater diameter than the shock-absorbing spring 14 and has a greater spring force. With its inner end, the return spring 21 is connected to an axial projection 23 of the coupling wheel 19, the axial projection 23 surrounding the sleeve 20 of the spring housing 12 at a distance. The outer end of the return spring 21 is connected to the inner circumferential wall of the spring housing 12.

The coupling wheel 19, at the outer circumference of the projection 15 which extends into the plane of the shock-absorbing spring 14 and encloses the spring 14, is provided with an outer toothing 25 which cooperates with a control device for the coupling wheel 19 in the form of a solenoid 26 and a pivotable locking lever 26a. The solenoid 26 with its coordinated locking lever 26a is arranged in the interior of the spring housing 12 by using the space which is provided due to the smaller diameter of the shock-absorbing spring 14 relative to the return spring 21. Thus, the solenoid 26 is arranged axially adjacent to the return spring 21 and radially adjacent to the shock-absorbing spring 14.

The spring housing 12, on the one hand, is connected to the housing 10 of the safety belt reeling device and for this purpose is pushed over a projection 28 of the extension 13 of the reeling arbor 11. The spring housing 12 is comprised of two parts, a bottom 27 and a cover 29 whereby the projection 28 which serves as a bearing bushing together with the bottom 27 is preferably provided as one piece.

The embodiment shown in FIG. 1 is provided with a rotational oil damper 30 having a damper housing 33 that is fixedly connected to the spring housing 12. The spindle 31 of the oil damper 30 penetrates the spring housing 12 in the area of the sleeve 20 for the wheel shaft 18 of the coupling wheel 19 and, via a transmission member 32, the axially aligned wheel shaft 18 and the spindle 31 are coupled to one another.

Figure 2:
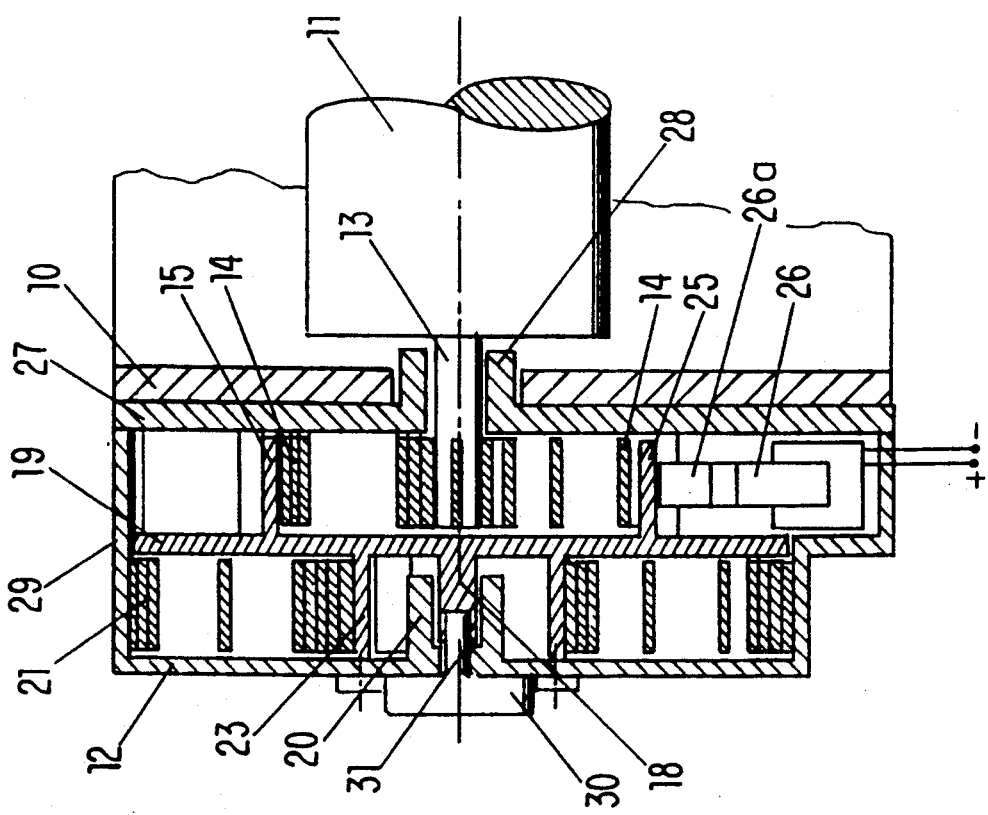
FIG. 2 shows a further embodiment of the inventive safety belt reeling device.

The embodiment according to FIG. 2 shows a rotational oil damper 30 arranged in the annular space which is located between the axial projection 23 of the coupling wheel 19, provided as a holding means for the return spring 21, and the sleeves 20 of the spring housing 12. The transmission member 32 couples radially the spindle 31 (in the form of a hollow spindle) and the wheel shaft 18 which are provided in different planes.

With respect to the function of the safety belt reeling device, the two springs 21 and 14, during the withdrawal of the safety belt from the safety belt reeling arbor 11 initially function as a single reeling spring due to their coupling via the freely rotatable coupling wheel 19. However, at a prescribed withdrawal state of the safety belt, the coupling wheel 19, after a respective signal from the solenoid 26 to the locking lever 26a, the coupling wheel 19 is stopped in its further rotational movement so that now only the shock-absorbing spring 14 performs as the reeling spring for the further withdrawal of the safety belt from the reeling arbor 11. At the same time, the return spring 21 is maintained in its fixed tension stage.

When the safety belt is reeled back onto the reeling arbor, the shock-absorbing spring 14 initially effects the rotation of the safety belt reeling arbor 11 whereby at a prescribed reeling state the locking lever 26a of the solenoid 26 releases the coupling wheel 19 so that the return spring 21 also acts on the reeling arbor 11 and supports the initial reeling movement initiated by the shock-absorbing spring 14. At the moment when the return spring 21 is switched the rotational oil damper 30 acts on the wheel shaft 18 of the coupling wheel 19 in a dampening manner such that no sudden shock is observed and the greater spring force of the return spring 21 becomes effective more strongly only with advancing reeling of the safety belt.

The present invention is, of course, in no way restricted to the specific disclosure of the specification and drawings, but also encompasses any modifications within the scope of the appended claims.

What I claim is:

1. A self-locking safety belt reeling device with a reeling arbor disposed in a belt housing, said safety belt reeling device further comprising:

a spring housing connected to said belt housing;

a return spring and a shock-absorbing spring both arranged inside said spring housing, said return spring having a greater spring force than said shock-absorbing spring;

a coupling wheel having a wheel shaft and being rotatably supported inside said spring housing for coupling said return spring to said shock-absorbing spring such that, in a first operational state, said return spring and said shock-absorbing spring together function as said reeling spring, and, in a second operational state, only said shock-absorbing spring functions as a reeling spring, said coupling wheel being actuatable as a function of a reeling state of said safety belt reeling device; and a rotational oil damper having a spindle and a damper housing, said oil damper being connected to said spring housing and said spindle being fixedly connected to said wheel shaft.

2. A self-locking safety belt reeling device according to claim 1, wherein said damper housing is connected to an outer wall of said spring housing, with said spindle penetrating said damper housing and said spring housing.

3. A self-locking safety belt reeling device according to claim 1, wherein said oil damper is positioned inside said spring housing.

4. A self-locking safety belt reeling device according to claim 3, wherein said coupling wheel further comprises an axial projection extending axially in a direction of said wheel shaft and said spring housing has a bearing means engaging said wheel shaft, said axial projection surrounding at a distance said bearing means, said return spring being connected to said axial projection and said oil damper being positioned in an annular space defined between said axial projection and said bearing means.

5. A self-locking safety belt reeling device according to claim 4, wherein said oil damper further comprises a radial transmission member connected to said spindle for connecting said spindle to said wheel shaft in a form-locking manner.

* * * * *